United States Patent [19]

Silver et al.

[11] Patent Number: 5,492,712
[45] Date of Patent: Feb. 20, 1996

[54] STABILIZED PASTA PRODUCTS

[76] Inventors: Shmuel Silver; Nechama Silver, both of Mobile Post Hamercaz, Mevo Mod'im, Israel

[21] Appl. No.: 246,963

[22] Filed: May 20, 1994

[30] Foreign Application Priority Data

Jun. 13, 1993 [IL] Israel .......................................... 105999

[51] Int. Cl.⁶ ................................. A23L 1/16; A23L 1/20; A23L 1/214
[52] U.S. Cl. ........................................... 426/557; 426/451
[58] Field of Search ...................... 426/557, 451

[56] References Cited

U.S. PATENT DOCUMENTS

| | | | |
|---|---|---|---|
| 3,992,554 | 11/1976 | Blake et al. | 426/557 |
| 4,269,863 | 5/1981 | Inagami et al. | 426/557 |
| 4,435,435 | 3/1984 | Hsu | 426/557 |
| 4,517,215 | 5/1985 | Hsu | 426/557 |
| 4,544,563 | 10/1985 | Lechthaler | 426/557 |
| 4,840,808 | 6/1989 | Lee et al. | 426/557 |
| 5,087,470 | 2/1992 | Sarabhai | 426/557 |

OTHER PUBLICATIONS

Pub. Abstract, C.A. 98: 142197s; (1983).
Pub. Abstract, C.A. 100: 67117v; (1984).
Pub. Abstract C.A. 110: 22559f; (1989).
Pub. Abstract C.A. 112: 177276b (1990).

*Primary Examiner*—Donald E. Czaja
*Assistant Examiner*—Choon Koh
*Attorney, Agent, or Firm*—Dann, Dorfman, Herrell and Skillman; Henry H. Skillman

[57] ABSTRACT

The invention provides a pasta product consisting essentially of low gluten or gluten-free flour, the flour being selected from the group consisting of uncooked grain, legume, tuber or vegetable flours, in combination with water and stabilizers.

3 Claims, No Drawings

STABILIZED PASTA PRODUCTS

The present invention relates to pasta products. More particularly, the present invention relates to pasta products produced from flours containing little or no gluten.

There exist on the market today gluten-free rice pasta products, traditionally made in the Far East, which are transparent strings made from starch extracted from boiled white rice. There is, however, a desire on the part of many consumers for pasta products from non-cooked, whole rice flour which would provide a quick, easy to prepare, delicious product with all the nutritional value of whole rice.

There is also a large population of consumers who are allergic to wheat and/or gluten found in several grains, who could benefit from a gluten-free pasta product.

An attempt was made to produce pasta products from a dough made of a whole-grain uncooked rice flour and water, using an extrusion process. The result, however, was that the pasta crumbled after drying, due to the lack of gluten in rice.

According to the present invention, it has now been discovered that extruded pasta products which do not crumble, do not fall apart during cooking, and provide a smooth, attractive appearance and good taste, can be produced from whole-grain and other flours containing no gluten or low gluten levels by the addition of stabilizers in place of gluten. It has further been found that such pasta products can also be prepared from uncooked legume, tuber or vegetable flours.

Thus, according to the present invention there is now provided a pasta product consisting essentially of low gluten or gluten-free flour, said flour being selected from the group consisting of uncooked grain, legume, tuber or vegetable flours, in combination with water and stabilizers.

The quantity of stabilizer or stabilizers utilized in the present invention depends on the level of gluten in the flour used and the strength of the stabilizer. In preferred embodiments of the present invention, said stabilizers are selected from the group consisting of agar-agar, carrageenan, locust bean gum, guar gum, gum arabic, xanthan gum, carob seed gum, pectin, lecithin, and combinations thereof, and are present in an amount of 0.01–5.0 w/w %.

In especially preferred embodiments of the present invention, said stabilizers comprise a mixture of guar gum and xanthan gum, and are preferably present in a total amount of about 0.5–1.5 w/w %. Thus, e.g., an especially effective stabilizer combination was found to be a synergistic combination of between about 0.4 to about 0.8 w/w % guar gum, in combination with about 0.2 to about 0.4 w/w % xanthan gum.

The quantity of water in the dough depends on the type of flour and the type and quantity of stabilizer; however, the preferred range is approximately 25–35 w/w %.

As stated above, a variety of pasta products can be prepared from flour of uncooked grains such as rice; uncooked legumes such as corn, chickpeas and lentils; uncooked tubers such as Jerusalem artichokes, and vegetables such as buckwheat.

If desired, the pasta product according to the present invention may further comprise additional ingredients selected from the group consisting of flavouring, colourants, nutrients, vitamins, minerals, and combinations thereof.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLES

Three gluten-free or low-gluten pastas were prepared from the following ingredients in the amounts indicated:

Example 1—Rice Pasta 70.07 w/w % uncooked rice flour
29.19 w/w % water
0.53 w/w % guar gum
0.21 w/w % xanthan gum

Example 2—Buckwheat Pasta 69.01 w/w % uncooked buckwheat flour
29.9 w/w % water
0.78 w/w % guar gum
0.31 w/w % xanthan gum

Example 3—Corn and Rice Pasta 34.51 w/w % uncooked corn flour
34.5 w/w % uncooked rice flour
29.9 w/w % water
0.78 w/w % guar gum
0.31 w/w % xanthan gum

Method of Preparation

Dry, uncooked flour is first measured to the desired quantity. The stabilizer or the combined mixture of stabilizers is added to the flour and mixed well in dry form. The water is then added to the flour-stabilizer mixture, optionally along with any of the further ingredients listed above, and the combination is mixed for approximately 10 minutes to form a dough. The dough is then passed through an extruder to form the pasta, which is allowed to dry in blower-circulated air, and is then packaged for sale.

The pasta produced according to the present invention is prepared by the consumer in the conventional manner, i.e., it is added to boiling water, cooked until tender, and immediately strained.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A pasta product produced by extrusion without heating and consisting essentially of low gluten or gluten-free flour, said flour being uncooked and being selected from the group consisting of uncooked grain, legume, tuber or vegetable flours, in combination with water and a mixture of guar gum and xanthan gum stabilizers.

2. A pasta product according to claim 1, wherein said stabilizers are present in an amount of about 0.01–5.0 w/w %.

3. A pasta product according to claim 1, further comprising additional ingredients selected from the group consisting of flavouring, colourants, nutrients, vitamins, minerals, and combinations thereof.

* * * * *